United States Patent [19]
Gazdzinski

[11] Patent Number: 6,068,328
[45] Date of Patent: May 30, 2000

[54] VEHICULAR BOUNDARY LAYER CONTROL SYSTEM AND METHOD

[76] Inventor: Robert F. Gazdzinski, 5862D Mission Center Rd., San Diego, Calif. 92123

[21] Appl. No.: 08/978,287

[22] Filed: Nov. 25, 1997

[51] Int. Cl.$^7$ .................................................. B62D 35/00
[52] U.S. Cl. ........................ 296/185; 244/203; 244/204; 244/208; 244/209; 296/180.1
[58] Field of Search ................................ 296/185, 180.1; 244/203, 204, 208, 209

[56] References Cited

U.S. PATENT DOCUMENTS

| | | | |
|---|---|---|---|
| 3,077,321 | 2/1963 | Dunham . | |
| 4,146,202 | 3/1979 | Pender | 244/209 |
| 4,807,831 | 2/1989 | Brewer et al. | 244/117 |
| 5,222,698 | 6/1993 | Nelson et al. | 244/203 |
| 5,236,155 | 8/1993 | Hrach | 244/208 |
| 5,348,256 | 9/1994 | Parikh | 244/208 |
| 5,407,245 | 4/1995 | Geropp | 296/180.1 |
| 5,409,287 | 4/1995 | Suzuki | 296/180.1 |
| 5,417,391 | 5/1995 | Saritsky | 244/199 |
| 5,908,217 | 6/1999 | Englar | 296/180.1 |

OTHER PUBLICATIONS

Internet address http://www.woodhill.co.uk/setup; McLaren F1 automotive design and technical website (No Date).

Joslin, Ronald D., "Simulation of Three Dimensional Symmetric and Asymmetric Instabilities in Attachment–Line Boundary Layers", NASA Langley Research (date unknown).

Buckley, Frank T., et al, "Feasibility of Active Boundary Layer Control Methods for Reducing Aerodynamic Drag on Tractor Trailer Trucks", Journal of Industrial Aerodynamics, 1979, pp. 133–148.

Mullenbach, P. and K.R. Deutenbach, "Influence of Boundary Layer Control Systems on the Flow Field Around Passenger Cars", Journal of Wind Engineering and Industrial Aerodynamics, 1991, pp. 29–45.

*Primary Examiner*—Dennis H. Pedder
*Assistant Examiner*—Mickki D. Murray
*Attorney, Agent, or Firm*—Gazdzinski & Assoc.

[57] ABSTRACT

A vehicular boundary layer control system utilizing a series of external perforation arrays and suction sources controlled by a digital signal processor or microprocessor. Each array of perforations in the outer vehicle skin is served by a plenum chamber, which is selectively isolable from a suction manifold. The desired vacuum for each individual plenum and associated array is determined through the sampling of the turbulence associated with that array as well as other sensed environmental parameters. Vacuum is maintained at the desired level in each plenum through the arbitration of various suction sources and the selective restriction of airflow from the plenum(s) to the suction manifold. For terrestrial aerodynamic vehicles, a series of moisture separators are included in the plenums to mitigate the effects of any ingested moisture. The system also includes provision to induce reverse flow through the suction manifold, plenums, and perforation arrays in order to purge the system of dust and other particulates, which may be ingested during operation.

13 Claims, 11 Drawing Sheets

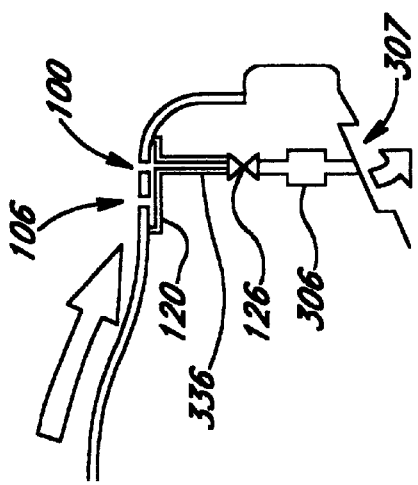
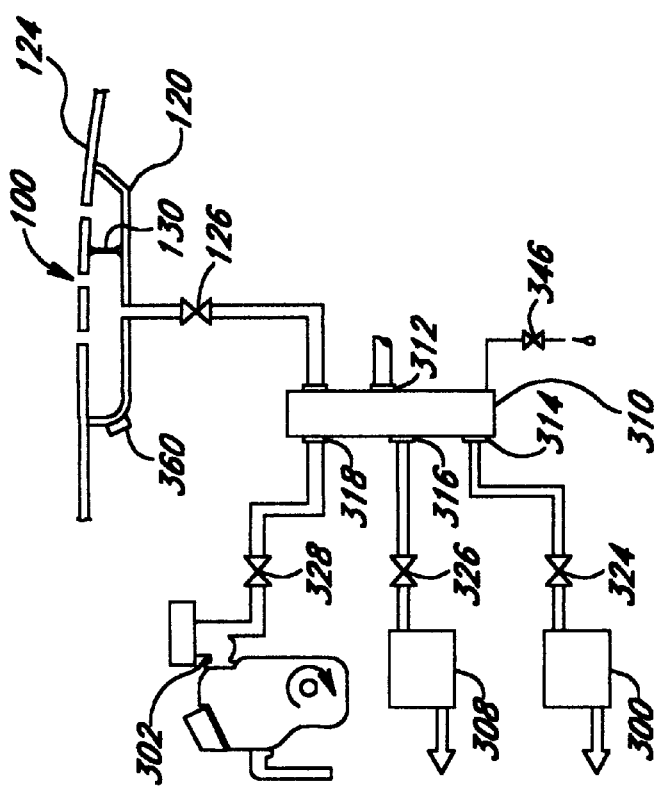
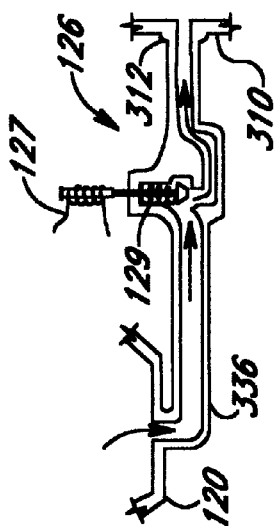

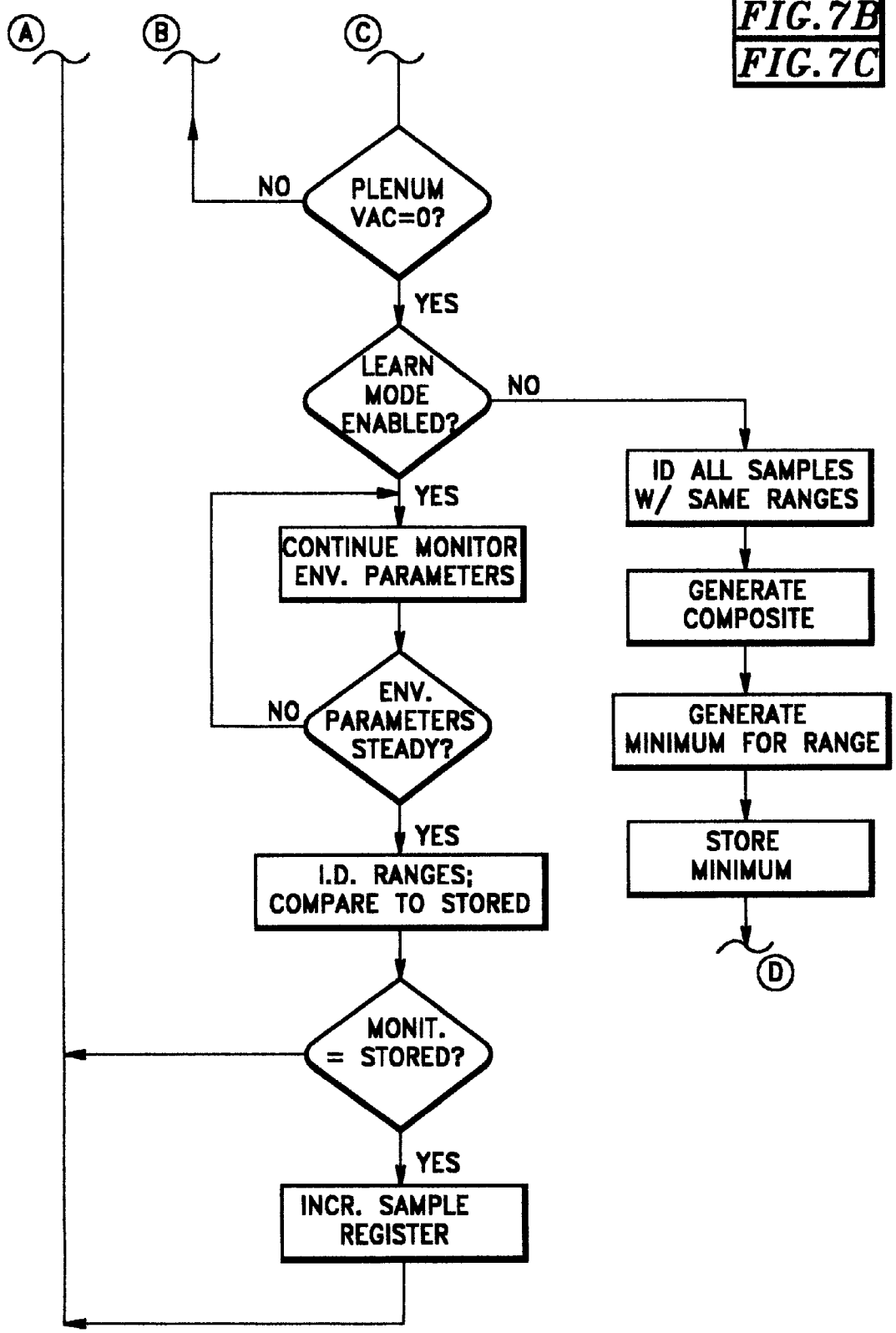

VEHICULAR BOUNDARY LAYER CONTROL SYSTEM AND METHOD

BACKGROUND OF THE INVENTION

1. Field of the Invention

The present invention relates to the field of vehicular transport, specifically to the reduction of aerodynamic friction associated with such vehicles during operation.

2. Description of Related Technology

Most all vehicles which operate at an appreciable air velocity are subject to the effects of aerodynamic drag. Drag is undesirable in that it necessitates a greater energy output to maintain a given vehicle velocity as compared to the same situation without drag. This greater required energy output translates into reduced fuel efficiency (or energy efficiency for non-fossil fuel vehicles). Additionally, in the case of fossil fuel-powered vehicles, the expenditure of this additional energy necessarily results in increased combustion by-product emissions (including typically hydrocarbons and carbon monoxide) which may have any number of deleterious effects.

Aerodynamic drag results from the relative motion of the surrounding fluid (air) around the vehicle during operation. In the most simplistic case, the air is stagnant with respect to the ground such that the air and ground speeds of the vehicle are equivalent. However, a more accurate model recognizes that the air in any given location moves in relation to the ground in a complex manner. In general, however, the predominant source of aerodynamic drag in a ground vehicle on average is directly attributable to the vehicular motion in relation to the ground. That is, comparatively little aerodynamic drag is the result of factors such as headwinds, downdrafts, or the like. Hence, in a general sense, drag is proportional to the speed of the vehicle. Accordingly, at higher speeds, reduction of the aerodynamic drag associated with the forward motion of the vehicle through the air would in most cases produce a significant benefit in terms of increased efficiency.

A variety of different systems and techniques (both active and passive) have been employed on ground vehicles in an attempt to reduce aerodynamic drag. These systems and techniques have included the use of air dams and/or spoilers, conformal moldings and body components, variation in the angle and/or position of the cooling radiator, use of low-friction coatings, and the creation of low pressure areas in various portions of the vehicle to redirect air flow. While great strides have been made in reducing the aerodynamic drag associated with the typical passenger vehicle or tractor-trailer, further reductions in drag are still possible.

When evaluating the efficacy of any proposed system for reducing drag, consideration must be given to the overall energy balance of the vehicle. Specifically, a system which reduces aerodynamic drag at the expense of other efficiencies may not be desirable. In short, there must be a net savings in energy output for the vehicle under the prescribed operating conditions in order to warrant the use of the system. One solution to this problem is to utilize existing inefficiencies or losses to support operation of the drag reduction system. Hence, if existing systems and components can be used to accomplish these aims, further inefficiencies (such as those resulting from added weight and/or required power) can be reduced or even eliminated.

Another consideration relates to the changing operational environment of the typical ground vehicle. Such vehicles as a whole operate in relative extremes of temperature, humidity and precipitation, altitude, and particulate contamination (dust). Variations in humidity/precipitation, altitude, and temperature can affect aerodynamic drag and air density, thereby dictating that any viable drag reduction system be adaptive to such variations, or at a minimum effective in those environments in which the vehicle is predominantly operated.

PRIOR ART BOUNDARY LAYER CONTROL SYSTEMS

Prior art boundary layer control systems generally utilize a comparatively low pressure or high pressure air source to control the thickness and/or flow characteristics of the boundary layer. However, as demonstrated with respect to the patents and articles discussed below, these systems generally are not able to interactively control and affect the boundary layer in discrete portions of the wetted surfaces of the vehicle/aircraft under varying environmental conditions. Furthermore, such prior art systems are often impractical for use in comparatively low-cost commercial ground vehicles.

U.S. Pat. No. 4,807,831 "Combination Boundary Layer Control System for High Altitude Aircraft" ('831 patent), discloses a combination boundary layer control system that utilizes both suction and cryogenic cooling to reduce aerodynamic drag using a comparatively a low input energy. This system is employed during altitude transitions in aircraft to minimize boundary layer separation and resulting increased drag. The system uses a network of air ducts which are connected to, inter alia, a suction pump to draw air through a multitude of small-diameter holes in the aircraft skin. Cryogenic cooling is employed once the aircraft has achieved high altitude to assist in minimizing boundary layer separation. However, the technique described in the '831 patent is adapted to use on high-altitude aircraft only, and requires a cryogenic cooling system be carried onboard which necessitates added weight and complexity. Furthermore, no facility is provided to selectively operate various portions of the suction hole array to "fine tune" the aircraft boundary layer under dynamic operational conditions. The disposal of ingested moisture and clearance of obstructed holes are not provided for, and the cryogenic cooling system can not be utilized in high moisture environments due to icing, thereby rendering this system largely impractical for ground vehicle use.

U.S. Pat. No. 4,146,202, "Aircraft Suction System for Laminar Flow Control" discloses a system by which laminar aerodynamic flow over the wetted surfaces (wings) of an aircraft is controlled by way of suction applied to the porous aircraft skin. The suction applied to the suction chamber within the aircraft wings is created by way of the low-bypass turbojet engines used to propel the aircraft, which connects to the porous surface through a series of plenums and flow control valves inside the wing structure. The invention further employs a system of "fences" to segregate differential suction pressures (and flows) created in varying portions of the wing by different suction hole and valve sizes. As with the '831 patent previously described, the invention of the '202 patent is adapted for use with aircraft, and suffers many of the same disabilities with respect to dynamic flow control and clearance of moisture and obstructions. Furthermore, a complex assembly consisting of an outer compliant porous skin, inner coarse pore skin, and rigid structural skin layer with valve inserts is required, which translates into comparatively high fabrication and repair costs. Such a complex structure is dictated by the '202 patent to address a variety of considerations not applicable to the ground vehicle context, including most importantly "lift destroying reverse flow."

U.S. Pat. No. 5,409,287, "Aerodynamic Device," discloses a system to reduce aerodynamic drag and promote laminar airflow over a motorcycle and rider by generating a boundary layer in proximity to various components on the motorcycle and rider's helmet. As part of the invention, air is inducted through a ram air inlet into plenums resident in both the motorcycle fairing and rider's helmet, and subsequently discharged through a plurality of small openings in each component respectively to induce the formation of a boundary layer. As with the inventions previously described, this system has no provision for dynamic control of the system during operation. Furthermore, the use of a ram air inlet requires the deceleration and resulting reduction in momentum of the air inducted into the plenum, thereby potentially creating an increased drag coefficient in the region of the ram inlet. Hence, any reduction in drag induced by the creation of the boundary layer over the fairing/helmet may be offset in whole or part by the increase in drag resulting from the ram inlet.

U.S. Pat. No. 5,222,698, "Control of Boundary Layer Flow," describes the use of an array of acoustic turbulence detectors which completely controls (via a control valve) the application of suction to a singular discrete suction panel located on the wetted surface of an aircraft. The system is designed to maintain the transition point (interface between turbulent and laminar boundary flow) over a downstream acoustic detector array in order reduce turbulence in the region of the most downstream detectors. The system described in the '698 patent does not, however, provide for dynamic control of the suction source and control valve based on the operational condition of the aircraft. Additionally, the system does not provide for localized, dynamic "tuning" of the boundary layer, nor is it responsive to parametric inputs other than those from the acoustic detector array.

"Feasibility of Active Boundary-Layer-Control Methods for Reducing Aerodynamic Drag on Tractor Trailer Trucks," F. T. Buckley, Jr. and C. H. Marks, Journal of Industrial Aerodynamics (1979), describes the use of fixed aperture suction slots placed parallel and aft of the edge formed by the front vertical surface and top (horizontal) surface of a tractor cab. This static slotting system uses a suction plenum via a rigid pipe ultimately connected to a vacuum tank, and is intended primarily to reduce flow separation along these edges. See also "Influence of boundary layer control systems on the flow field around passenger cars," P. Mullenbach and K. Dutenbach, Journal of Wind Engineering and Industrial Aerodynamics, 1991, which describes wind tunnel testing with a suction placed at one discrete location (such as ahead of the vehicle) to influence the thickness of the boundary layer created.

Based on the foregoing, it would be most desirable to provide a boundary layer control system for use with a terrestrial vehicle which reduces the aerodynamic drag associated with the vehicle during normal operation and increases its overall fuel or energy efficiency. Such system ideally would substantially utilize existing vehicular systems to accomplish these desired results, thereby minimizing any increases in weight, required interior space, or vehicle complexity. Furthermore, such a system would be dynamically controlled and adaptive so as to operate efficiently under all operational and environmental conditions reasonably foreseeable for the vehicle.

Similarly, it would be desirable to provide a method of operating this system so as to achieve the aforementioned goals of reduced air friction and increased efficiency while requiring essentially no action by or intervention from the vehicle operator during varying operational or environmental conditions.

SUMMARY OF THE INVENTION

The present invention satisfies the aforementioned needs by providing an improved vehicular boundary layer control system and method of operating the same.

In a first embodiment, the boundary layer control system of the present invention utilizes a series of segregated, specially sized suction aperture arrays in the vehicle outer skin to reduce aerodynamic drag. Each array is served by a plenum located beneath the outer skin of the vehicle. The system primarily employs typical, existing on-board vehicle air systems such as engine induction and/or emissions control to generate spatially and/or temporally variant suction at the vehicle skin surface, the level of suction being determined in part by a set of turbulence detectors mounted at several key locations on the vehicle. A high-flow suction pump is used as a supplemental suction source when needed. Suction is controlled through use of a digital signal processor (DSP) or similar device, which controls the operation and loading of the various suction source(s), as well as a series of control valves and dampers placed within the system between the arrays and the suction source(s).

In a further aspect of the invention, the suction level is related in part to other sensed or artificially generated parameters (including vehicle speed) so as to minimize unnecessary expenditures of energy during operational conditions in which the boundary layer control system may be of minimal usefulness. The aforementioned DSP is also used to evaluate data obtained from a variety of different sensors on the vehicle in order to initially "train" the system, maintain an updated vehicle aerodynamic profile, and automatically control the operation of the boundary layer control system to optimal efficiency, thereby freeing the vehicle operator to attend to vehicle operation and safety more completely.

In yet a further aspect of the invention, the system provides for the removal of ingested moisture, as well as particulates which may obstruct portions of the aperture arrays. Moisture is removed from the ingested air through a series of moisture separators and drain valves within the aforementioned plenums. Particulates are periodically flushed from the system through use of a high pressure source which induces reverse flow within the system.

BRIEF DESCRIPTION OF THE DRAWINGS

FIG. 3 is a schematic diagram of a preferred embodiment of the plenum, manifold, and suction source arrangement of the present invention.

FIG. 3a is a cross-sectional diagram of a remote manifold, array, and isolator of the present invention.

FIG. 4 is a detail view of a preferred embodiment of the suction conduit and isolator arrangement of the present invention.

DETAILED DESCRIPTION OF THE PREFERRED EMBODIMENTS

Reference is now made to the drawings wherein like numerals refer to like parts throughout.

While the following description is made with reference to terrestrial vehicles, it can be appreciated that many of the aspects of the present invention may generally be adapted to use on other types of vehicles operating in other types of fluidic environments. For example, submerged vehicles may employ the general method of this invention to reduce hydrodynamic turbulence as such vehicles move through the water.

Figure 1:
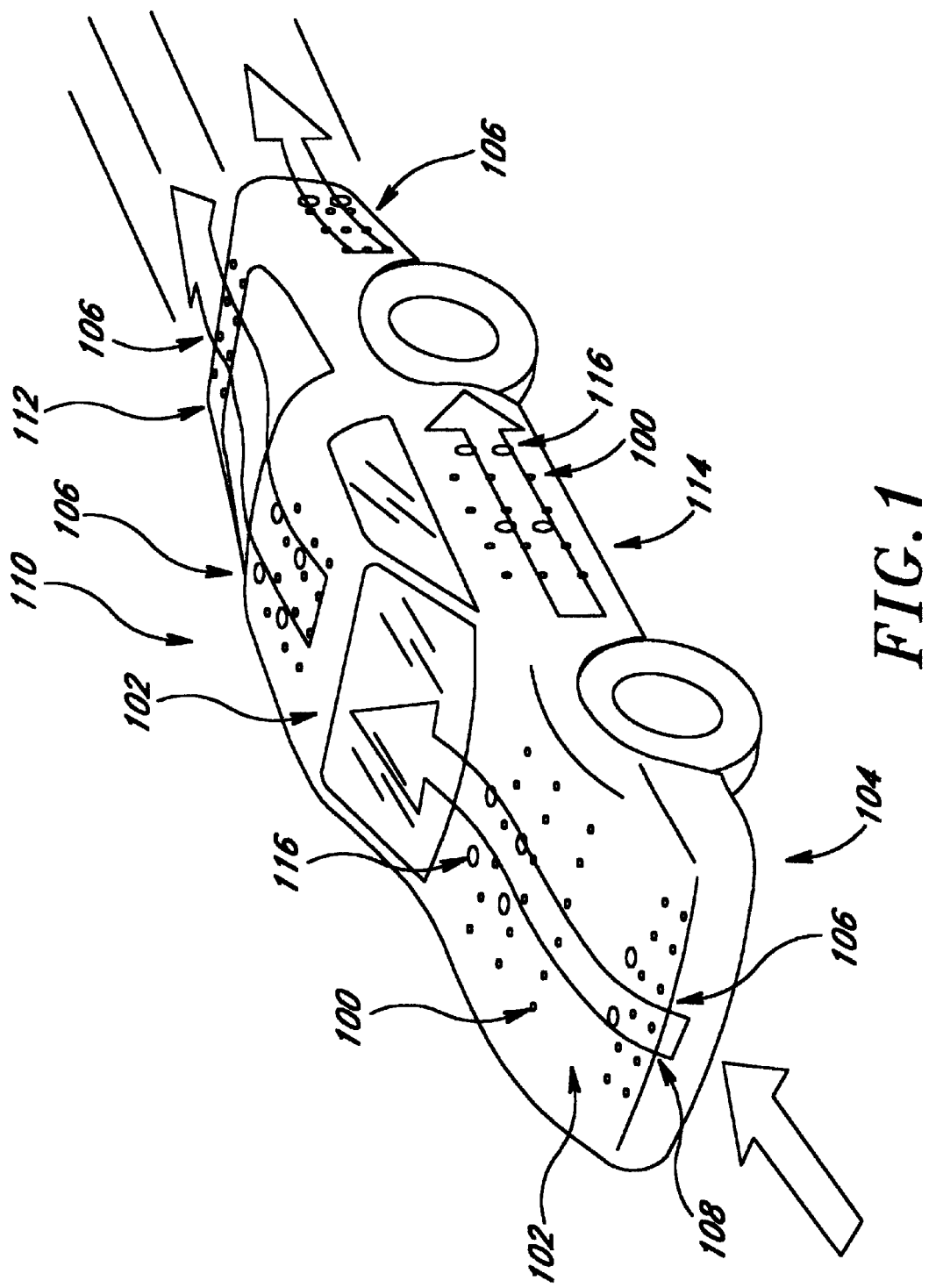
FIG. 1 is a perspective view of a terrestrial vehicle showing external components of the boundary layer control system of the present invention.
Figure 2:
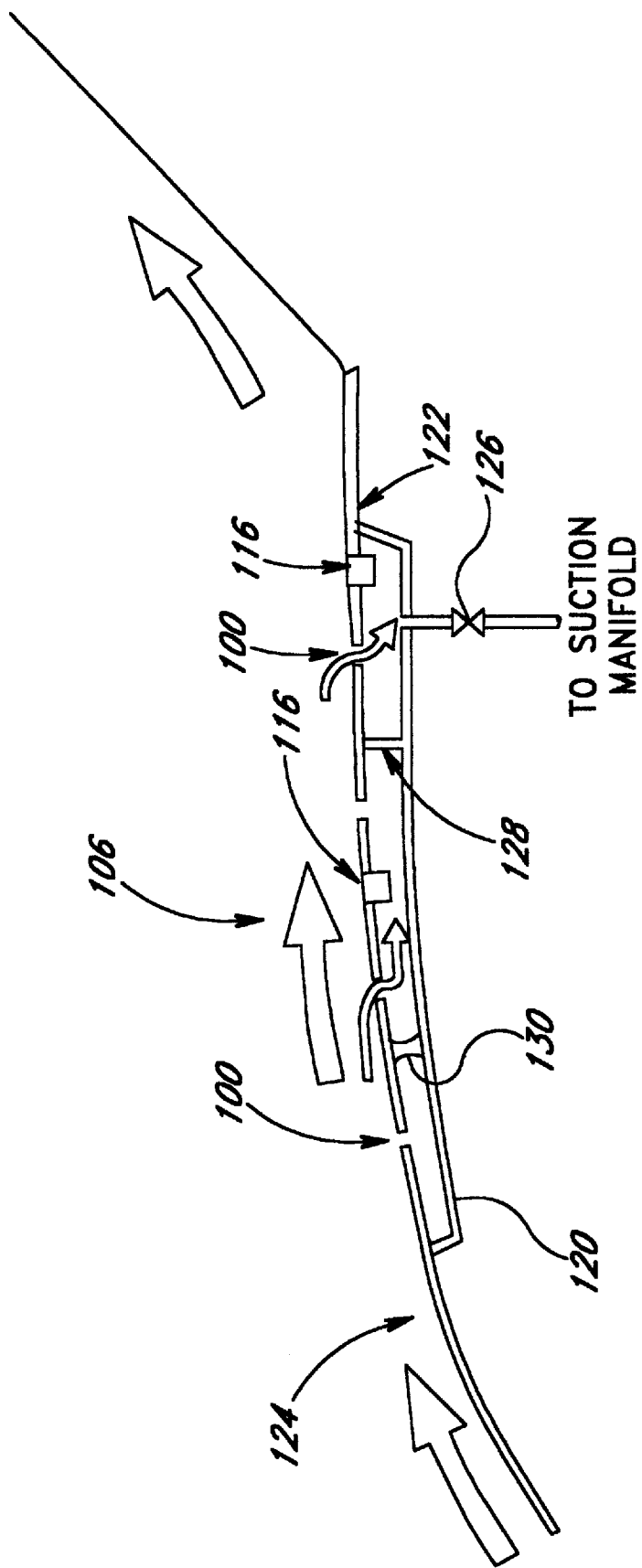
FIG. 2 is a cross-sectional diagram of a perforation array and plenum arrangement of the present invention.

FIGS. 1 and 2 show a first embodiment of the improved vehicular boundary layer control system (BLCS) of the present invention as adapted to a passenger automobile. Referring now to FIG. 1, a plurality of perforations 100 or holes are formed within the outer surface 102 of the vehicle 104. These perforations are substantially circular in cross-section, although it can be appreciated that a variety of different cross-sectional shapes and perforation constructions may be used with equal success, depending on the needs of the individual application. Typically, perforation diameters on the order of a few thousandths of an inch are sufficient, although the diameter of each perforation (or subsets of perforations) may vary depending on the desired characteristics in a particular region of the vehicle outer surface. In such a manner, the flow resistance ("head loss") associated with each perforation or group thereof may be tuned in any desired manner. In the present embodiment, "arrays" of perforations 106 are formed in regions previously determined to be critical with respect to aerodynamic flow and boundary layer formation and control including (but not limited to) the vehicle engine hood and frontal area 108, roof 110, trunk area 112, and sides 114. The diameter of individual perforations 100 may be uniform across all arrays, within any given array, within any given row or column of an array, or completely non-uniform, depending on the flow characteristics of the individual vehicle. One or more aerodynamic turbulence detectors 116 are placed in proximity to one or more of the arrays 106, such that any turbulence created in the vicinity of the array can be monitored during vehicle operation. In the present embodiment, acoustic turbulence detectors 116 of the type well know in the art are placed longitudinally within the array (in the direction of airflow) in staggered fashion as shown in FIG. 1 such that the magnitude and distribution of the turbulence can be more accurately monitored. These detectors are mounted conformally with the vehicle outer surface to minimize air friction and noise and enhance vehicle appearance and detector longevity. It can be appreciated, however, that other arrangements, sensing locations, and types of boundary layer monitoring devices may be used with similar efficacy.

Referring now to FIG. 2, a series of plenums 120 are used which cover the inner exposure of the perforations 100 and are sealed to the inner surface 122 of the vehicle bodywork 124 so as to permit the creation of a low pressure area (hereinafter referred to as "suction" or "vacuum", although it will be realized that such vacuum is imperfect) within each plenum. The plenums are mounted to the interior of the bodywork using any number of conventional fastening and sealing techniques, all of which are well known in the art. For example, adhesives coupled with sealing gaskets may be used to mount and seal the plenum, or conversely, the plenum may be molded or fabricated as an integral part of the bodywork. The plenums are further segregated in relation to subsets of their respective perforation array(s) 106 such that the aforementioned suction may be applied selectively to only portions of each array. This segregation, although not required, permits a greater degree of "tuning" of the suction array 106 as compared to a non-segregated array so as to achieve the most desirable aerodynamic characteristics. In the present embodiment, the selective application of suction to a plenum 120 or portion thereof is accomplished through the use of a series of variable position isolators 126 and/or tuned orifices 128, as described in greater detail below. The plenums 120 are ideally constructed of lightweight plastic material (such as polyethylene or comparable polymer) or integrally formed within the bodywork as channels so as to minimize vehicular weight and avoid corrosion, and are sized so as to provide only a very small diameter (i.e., on the order of a fraction of an inch) channel for air to flow, thereby reducing required space and suction source capacity. The plenums can be shaped so as to use otherwise unexploited space within the vehicle interior. In this fashion, interior volume of the vehicle is conserved for other equipment, and the external dimensions of the vehicle need not be expanded to accommodate the present invention. Separator stanchions 130 or other similar means may be used as required to segregate portions of each plenum 120, and provide mechanical support to prevent collapse of the plenum when suction force is applied to its interior surfaces during system operation.

In the present embodiment, suction within each plenum 120 is created through the use of several different suction sources within the vehicle, as shown in FIG. 3. To minimize weight and maximize fuel efficiency, existing onboard systems are used to the maximum extent practicable as the primary suction sources, and are supplemented with a secondary high volume air pump 308. This pump The existing systems used as suction sources include the emission control air pump 300 and engine fuel/air induction system 302, although other available sources may be used. Additionally, at high vehicle speeds, relative low pressure areas in and around the vehicle chassis may be used to assist in boundary layer control through localized porting of such areas to the plenum(s) by way of remote system manifolds 306. These sources 300, 302, 308 are connected to a primary or central manifold 310 having one or more suction ports 312 and a series of discharge ports 314, 316, 318 corresponding to each of the individual suction sources 300, 302, 308. A series of solenoid operated valves 324, 326, 328 are used to selectively connect one or more of the sources to the suction port 312 such that a suction applied by the connected source(s) is felt at the port 312. While the present embodiment employs solenoid valves and a multi-port manifold, it can be appreciated that other types of flow control devices and/or manifold designs may be used with equal success. Control of the solenoid valves 324, 326, 328 is accomplished by way of a controller 334, the function and logic of which is discussed in greater detail below. Secondary or remote manifolds 306 are also used to connect selected plenums in the vehicle to nearby low pressure areas created in and around the vehicle at high speed. For example, as shown in FIG. 3a, the trunk or upper-rear surface plenum 120 is selectively ported through an isolator 126 to a suction port 307 located in the wheel wells or other relative low-pressure area (which can be easily determined for each type of vehicle during wind-tunnel testing) separate of the primary manifold 310 and its associated suction sources. This "natural" suction reduces the energy demands of the BLCS on the vehicle engine thereby permitting reduced boundary layer turbulence without requiring additional energy to be expended.

As shown in FIG. 4, a sealed conduit 336 acts to connect the manifold suction port 312 to each plenum 120 such that suction at the port 312 is transferred and felt within the respective plenum 120 or portion thereof An isolator 126 is placed in the conduit 336 to permit selective isolation of a given plenum 120 from the manifold 310. A desirable characteristic of the isolator 126 is the ability to permit variable amounts of airflow (i.e., have a variable flow coefficient) such that the isolator is not required to continually fully open and close ("hunt") to achieve the desired plenum vacuum; however, this is not a requirement of the system. In the present embodiment, a spring-retarded solenoid valve is utilized as an isolator 126, although other designs of isolator are possible. As the solenoid coil 127 voltage/magnetic coupling is increased, the retarding force of the spring 129 is increasingly overcome, thereby opening (or closing) the valve further. The operation, construction, and power supply requirements of such solenoid valves is well known in the art. The desired level of plenum vacuum may also be maintained through the use of a two-position isolator (open/shut only) in conjunction with a variable position plenum vent valve. Numerous alternative prior art control system embodiments are possible in this application. It should be noted that for the sake of system efficiency, a low flow resistance is an important characteristic of the isolator or valve chosen. Control of the isolators 126 is accomplished by way of control signals generated by the controller 334, discussed further below.

Figure 5:
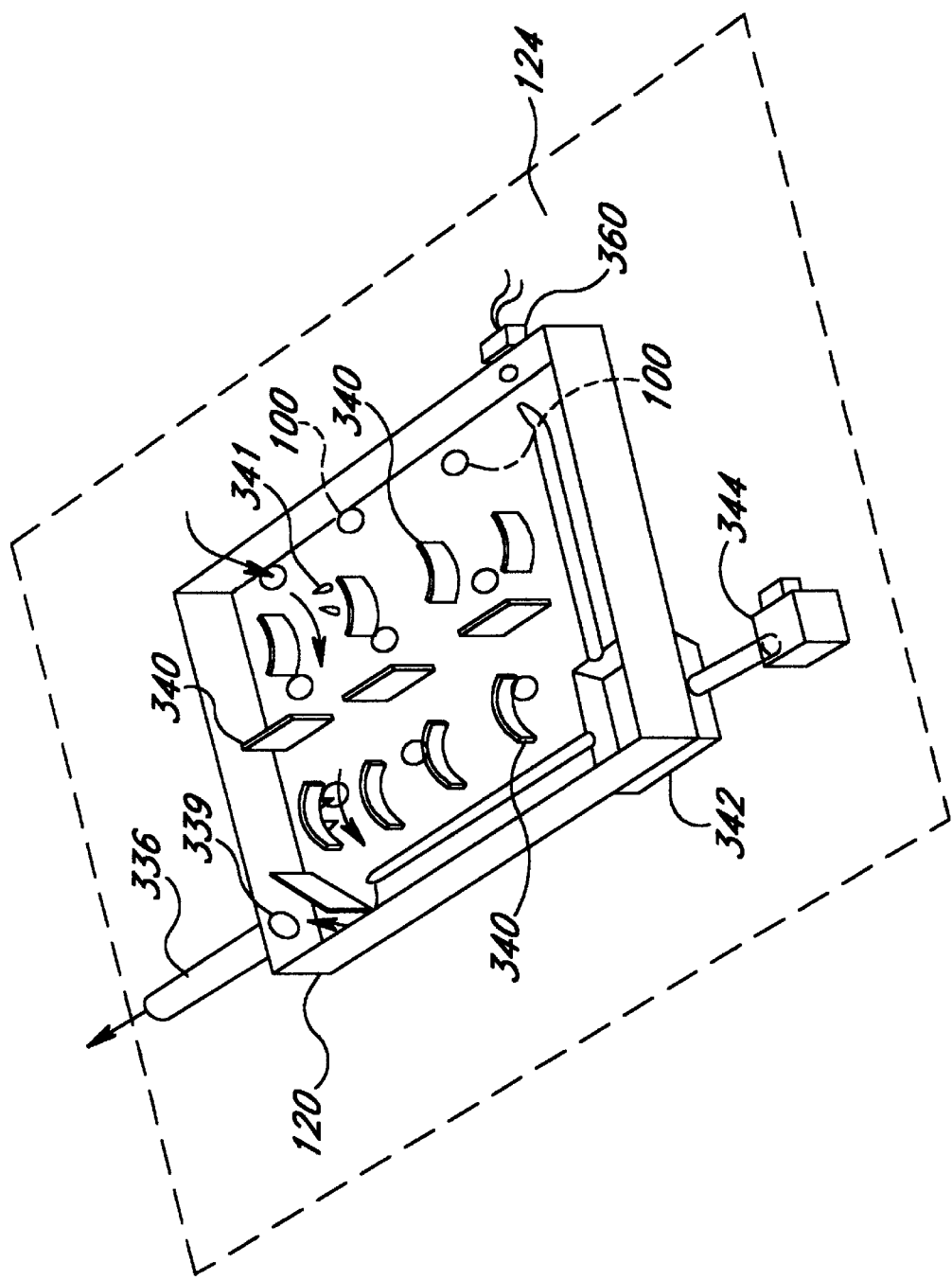
FIG. 5 is a detail view of a preferred embodiment of the plenum moisture separators of the present invention.

To preclude moisture from being drawn into the conduit 336 and ultimately the manifold 310, a series of centrifugal moisture separators are used to separate entrained moisture from the air within the plenum. The construction of such moisture separators is well known in the art; however in the present invention, such separation can be easily accomplished by creating a tortuous path between the array perforations 100 and the plenum outlet 339. As shown in FIG. 5, a series of curved vanes 340 are used in the present embodiment to provide such a tortuous path. Moisture 341 liberated by the separators drains to a catch basin 342 by way of gravity, and is further gravity-drained from the plenum in the present embodiment by a moisture sensitive drain valve 344, which opens only intermittently during high-moisture conditions to preserve plenum suction and to permit sufficient drainage static head to accumulate. The suction manifold 310 is also fitted with a moisture-operated drain valve 346 which acts as a global backup to that in each plenum. Additionally, the outlets 339 in each plenum are placed high on the plenum so as to further minimize the possibility of moisture ingestion by the suction sources. It should also be noted that the suction perforations 100 in the vehicle skin are generally of very small, thereby further restricting the ingress of significant quantities of moisture to the plenums.

Controller Operation

Figure 6:
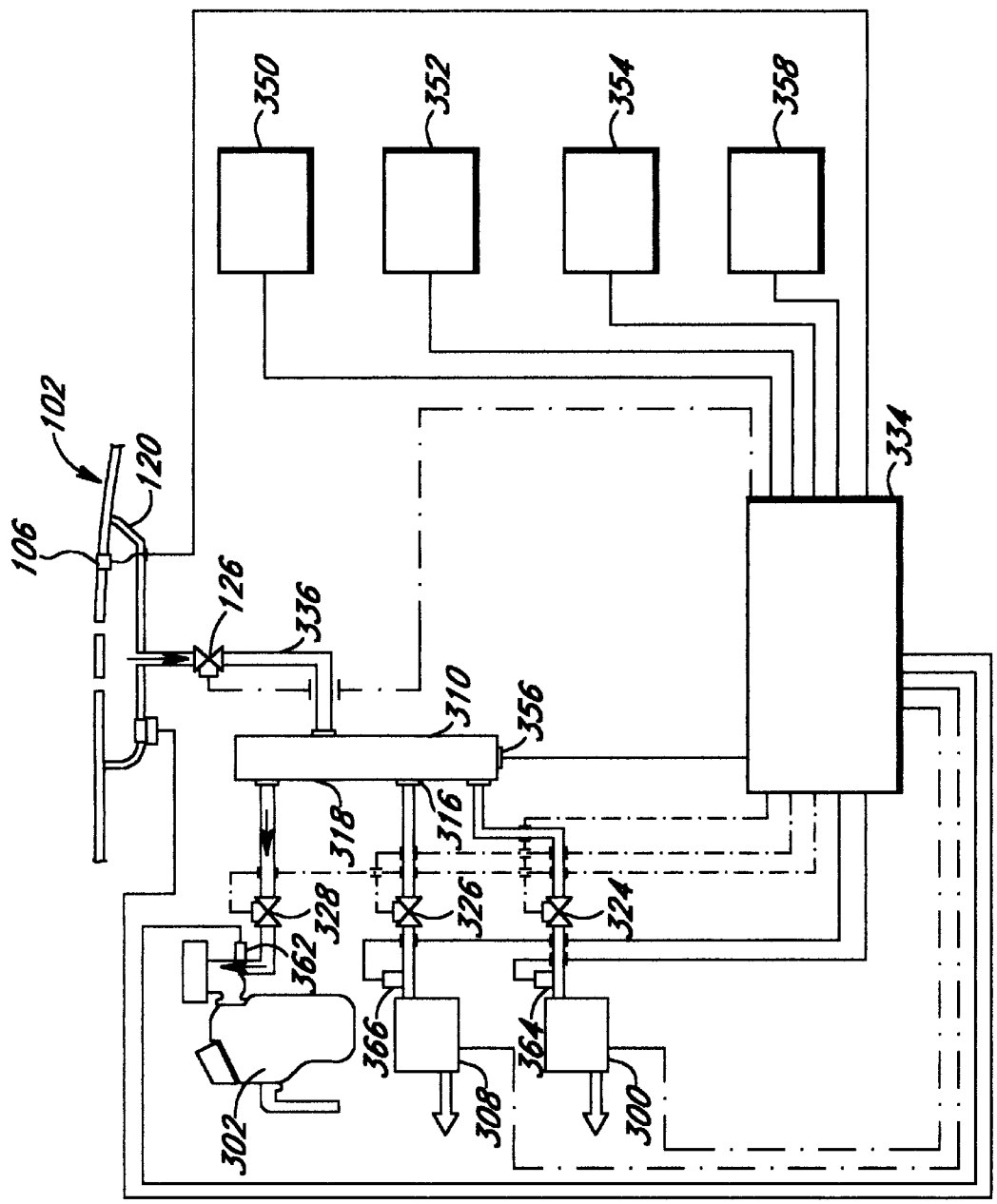
FIG. 6 is a schematic diagram showing a preferred control and instrumentation arrangement for the present invention.

Referring now to FIG. 6, a variety of control functions are provided by the BLCS controller 334. These functions include the receipt and analysis of data from a broad variety of inputs, instrumentation, and sensors, including the boundary layer turbulence detectors 116, vehicle speedometer electronic module 350, engine tachometer module 352, ambient temperature monitor 354, atmospheric pressure monitor 358, BLCS manifold 310 vacuum sensor 356, plenum vacuum monitors 360, and vacuum source vacuum monitors 362, 364, 366. Additionally, the controller dynamically generates signals to control the various isolators 126, valves, and suction sources 300, 302, 308 within the system, based on the aforementioned inputs.

A Texas Instruments TMS320C5x series DSP or equivalent component incorporating internal data and program memory is used as the controller 334 in the present embodiment, although it can be appreciated that a wide variety of different combinations of processors and/or microcontrollers (both singly or in multiple processor architectures), memory modules, software, firmware, and associated equipment can be used to accomplish the control functions described herein. Analog-to-digital (A/D) and digital-to-analog (D/A) front-end and back-end processing, of the type well known in the signal processing arts, may also be used to condition data received from and transmitted to the aforementioned instrumentation, sensors, and system components.

One of the primary functions of the controller 334 is to dynamically arbitrate between the various suction sources 300, 302, 308 connected to the primary manifold 310. This arbitration is accomplished through analysis of the input of signals from the primary suction manifold vacuum sensor 356, engine manifold vacuum sensor 362, emission control air pump suction-side vacuum sensor 364, engine tachometer module 352, and high volume suction pump suction sensor 366, as well as calculation of the desired plenum vacuum.

In the present embodiment, the desired vacuum is calculated for each plenum 120 on a rotating basis from an analysis algorithm which analyzes the input signal from the turbulence detectors over a given sampling interval based on a given vehicle speed. The algorithm "learns" the proper BLCS manifold vacuum for a given plenum through initial (and subsequent) use of a sampling routine (hereinafter referred to as "learn mode"). Specifically, when the vehicle reaches a stable speed (as determined by variance within a preset ground speed band for a given number of sampling intervals), the controller 334 isolates all other plenums and instructs the isolator for the plenum under analysis to slowly shut, thereby reducing plenum vacuum over a finite period of time. As the plenum vacuum decays to zero, the controller 334 samples the vacuum and turbulence sensors 116 associated with the array/plenum being tested periodically at a predetermined frequency and stores those sensed values, thereby constructing a functional representation (i.e., turbulence versus plenum vacuum "curve") for that plenum for the given speed and prevailing environmental conditions. The existing atmospheric temperature, pressure and vehicle speed values are converted to binary or hexadecimal equivalent addresses, at which the sensed data is stored in an X,Y (turbulence, plenum vacuum) numerical array for later retrieval and use. The storage addresses can be made "discrete" and associated with a predetermined range of values for each of the three environmental parameters, such that a given XY matrix is applied to all points within the range.

Figure 7A:
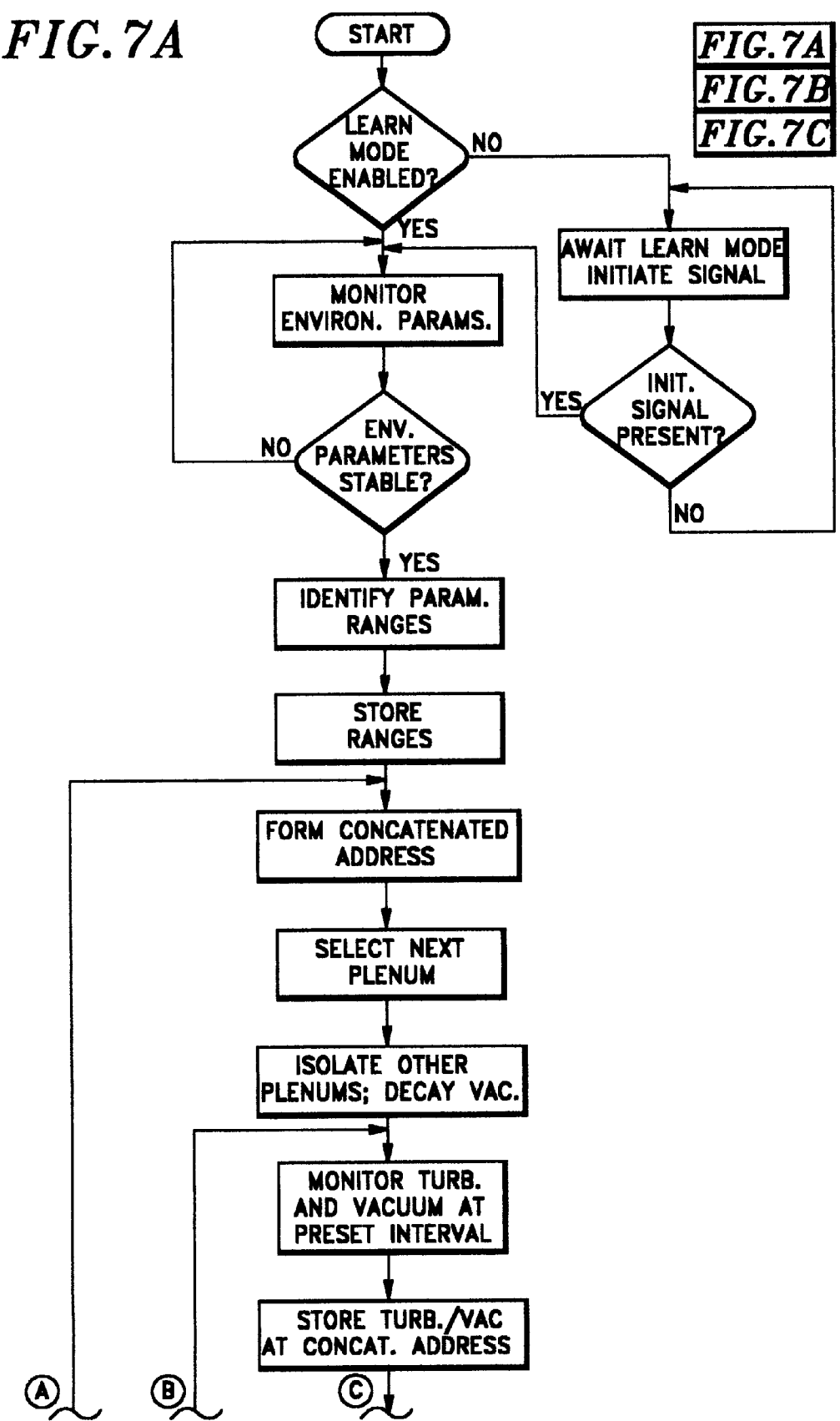
FIG. 7 is a logical flow chart showing the operation of the BLCS during "learn mode" and subsequent system operation.
Figure 7C:
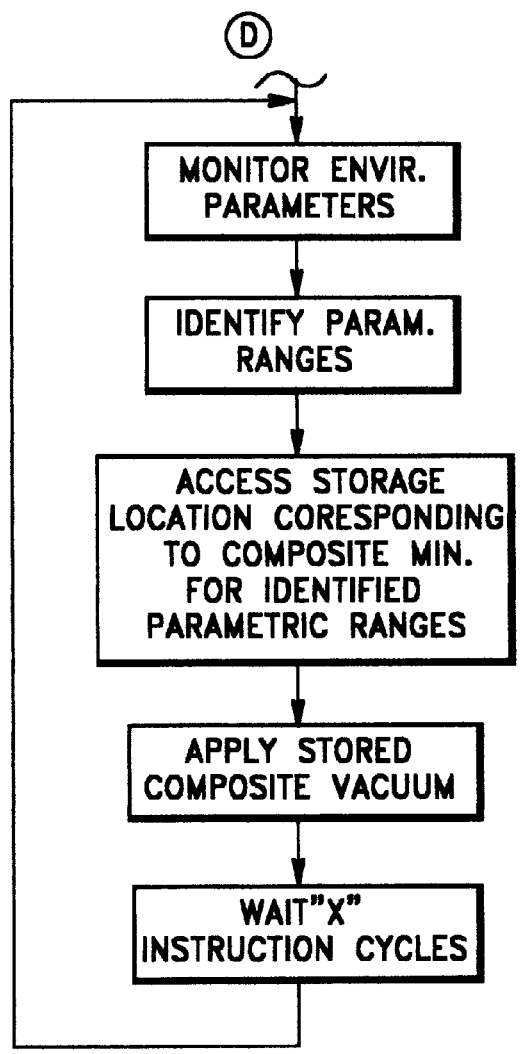

During later "learn mode" operation and when comparable environmental conditions are encountered, a register within the controller is incremented for each subsequent sampling, and the then-sampled turbulence/vacuum data stored at a different memory address resulting from the concatenated address and the incremented register. A separate register is maintained to identify the plenum; this value may also be concatenated with the prior address to uniquely identify the memory address for each plenum. In this fashion, the controller and memory cooperate to store a series of samples for each plenum and discrete environmental state. The "learned" data is then statistically analyzed by the controller using any number of well-known analysis algorithms or techniques (such as least-squares) to produce a composite set of turbulence/vacuum data for each state, which the controller then applies to the selected plenum when the state parameters are subsequently encountered during normal (i.e., non "learn mode") operation. FIG. 7 illustrates the logical flow of BLCS operation during learn mode and subsequent system operation.

As an example, assume that the decay of plenum vacuum requires ten second to complete, and the controller samples the plenum vacuum and turbulence ten times during this decay period. A 10 by 10 matrix of plenum vacuum versus sensed turbulence is therefore formed. An address is then concatenated from the binary representations of the three aforementioned environmental parameters, and the array stored within memory beginning at that address. When similar environmental conditions are again encountered during learn mode operation (say, for example, if the vehicle has decelerated and subsequently accelerated to the same speed), the controller will again begin the sampling routine for the plenum(s) to create a second set of sampled data, which is then stored at a different address (due to incrementing the sample number register) within memory. At the completion of learn mode operation, the controller identifies the X,Y data for each sampling period associated with a given discrete range of environmental parameters, and analyzes these data collectively using statistical methods to generate a composite X,Y profile to be used during all subsequent operating periods. Learn mode operation may be entered periodically (such as on a long drive) to update the composite X,Y profile for the most common vehicle environmental conditions.

Figure 8:
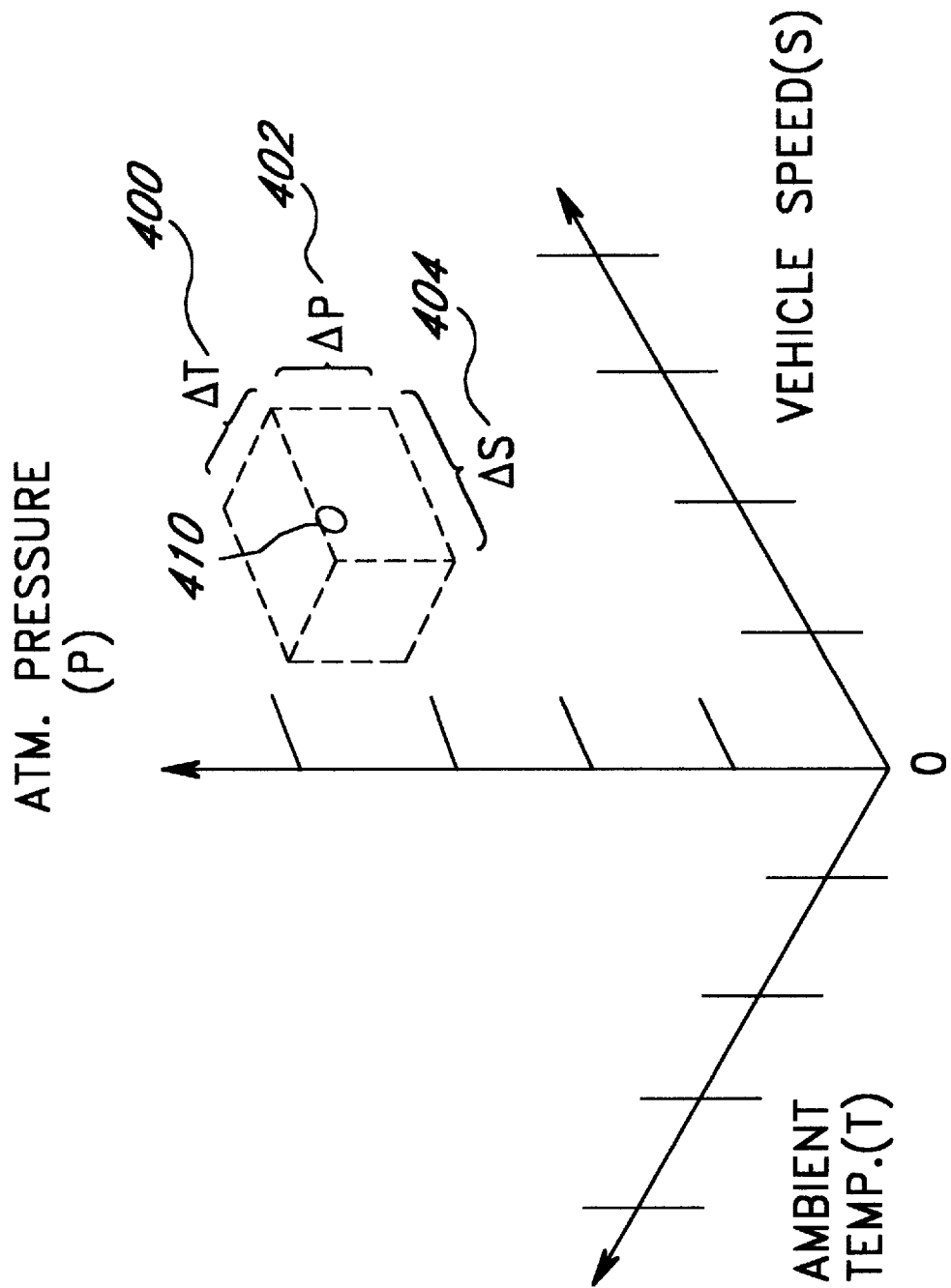
FIG. 8 is a graphical representation of the environmental parameter range classification scheme used in the present invention.

As previously noted, the concatenated addresses for a given plenum falling within a predetermined range (thereby correlating to ranges of the three environmental parameters) will be considered as the same address, with the exception of the sample number register. In practical terms, this allows the system to develop one composite data set for a discrete range of environmental parameters. FIG. 8 shows a graphical representation of a preferred embodiment of the environmental parameter range classification scheme of the present invention. As an example, all temperature, pressure, and speed (T, P, S) values falling in the range between T1, P1, S1 and T2, P2, S2 (or ΔT, ΔP, ΔS) 400, 402, 404 would be treated identically by the controller, and one composite data set developed for this range during learn mode operation. During subsequent nonlearn mode operation, this single composite set would be applied under all vehicle operating conditions falling within the aforementioned range. It can be readily appreciated from the foregoing discussion that other XY data addressing, storage, and retrieval schemes may be employed with equal effectiveness. It can further be appreciated that predetermined X,Y values (such as those based on computer modeling or wind-tunnel analyses) may be loaded into the controller/memory as software or firmware, or embodied as hardware logic, thereby obviating the need for a "learn mode" of operation. However, such approaches have the disadvantage of not being adapted specifically to modifications or changes in the aerodynamic properties of the subject vehicle (such as if a luggage rack or other external component is added, vehicle is wet or dry, dirty or clean, has damaged bodywork, etc.).

After the composite X,Y values for each plenum 120 have been determined for a given range of environmental conditions, the controller 334 utilizes any number of well-understood minimization algorithms or techniques to identify the optimal vacuum to be applied to the given plenum in that range to minimize turbulence over the perforation array. The controller then compares the required (optimal) vacuum for each of the various plenums on the vehicle, and controls the vacuum sources 300, 302, 308, as further described below, to maintain the suction manifold 310 at a vacuum at least as great as the highest required vacuum value. In this fashion, plenums requiring less vacuum can be selectively vented or isolated from the manifold 310, and the plenum 120 requiring the most vacuum can be directly ported to the manifold. This arrangement therefore permits the manifold 310 to maintain only as much vacuum as is needed, thereby reducing wasted energy and increasing system efficiency.

To permit further arbitration between the various suction sources 300, 302, 308, the controller compares, at a predetermined interval, the sensed vacuum for each suction source to 1) the desired minimum primary manifold vacuum described above, and 2) the actual manifold vacuum sensed by the manifold vacuum sensor 356. Suction sources having sensed vacuum lower (i.e., greater absolute pressure) than the manifold are isolated for a discrete number (at least one) of sensing intervals, unless the sensed manifold vacuum is higher than the desired value, in which case the higher pressure (lower vacuum) suction source is connected to raise manifold pressure to the desired level. A suction source having a sensed vacuum lower than the required value but greater than the sensed manifold vacuum will be kept connected to the manifold until the manifold vacuum and source suction vacuum equilibrate, at which time that suction source will be isolated. In this manner, the existing primary sources of vacuum such as the emission control air pump 300 and engine induction system 302 are used first before resorting to the high volume suction pump 308, thereby increasing BLCS efficiency. In the present embodiment, the high volume suction pump is driven by the vehicle engine via an electromagnetic clutch or similar arrangement, such that the pump 308 is only activated when an appropriate control signal is received from the controller 334 indicating the need for additional suction capacity.

In the present embodiment, the controller 334 also is programmed to shut down and/or isolates all suction sources 300, 302, 308 at very low vehicle speeds or when overridden by the vehicle operator. At low vehicle speeds, the BLCS may provide no appreciable benefit, and may actually reduce vehicle efficiency due to the continued operation of suction sources when vehicle aerodynamic drag is minimal. Hence, the controller is programmed to secure the high volume suction pump 308, and isolate all suction sources from the manifold via their individual isolators when such speed are reached and maintained for a given number of controller sampling iterations. Manual override is provided to permit operator control of the BLCS under all conditions of vehicle operation.

Description of Particulate Backflush System

Despite the narrow diameter of the array perforations in the vehicle exterior, dust and other particulate contaminants will accumulate within the, perforations, plenums and conduits over time. Blocking of the perforations is particularly deleterious to system performance. To mitigate the effects of blocking and the ingestion of dust and particulates, a reverse flow system is used to push comparatively high pressure air or exhaust gas back through the manifold(s) and plenums.

Figure 9:
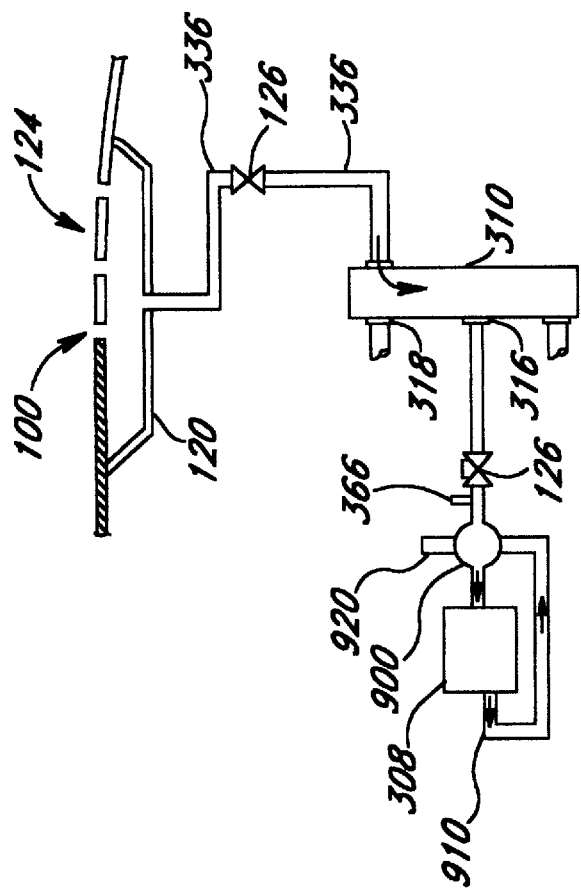
FIG. 9 is a schematic diagram of a first embodiment of the particulate backflush system of the present invention.
Figure 9A:
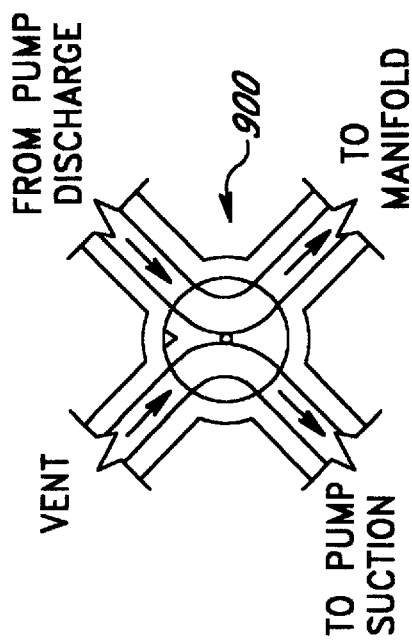
FIG. 9a is detail view of the 4-way, two position porting valve of the backflush system of FIG. 9, shown in the backflush position.
Figure 9B:
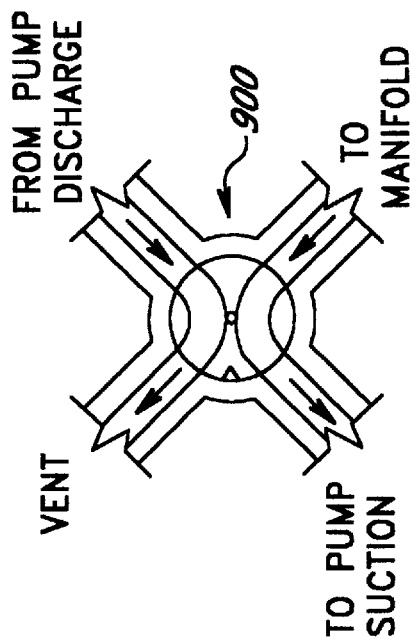
FIG. 9b is detail view of the 4-way, two position porting valve of the backflush system of FIG. 9, shown in its normal operating (suction) position.

In a first embodiment of the particulate backflush system, the high volume suction pump discharge is directed to the BLCS manifold by way of a four-way, two position porting valve 900 as shown in FIG. 9. The porting valve connects the suction pump 308 discharge 910 to an atmospheric vent 920 in a first position, and to the suction manifold 310 in a second position. The porting valve is controlled by signals from the controller 334 which reposition the valve from its normal position (i.e., porting the high flow pump 308 suction to the manifold 310, as shown in FIG. 9b) to the backflush position (FIG. 9a) on vehicle startup, and subsequently return the valve 900 to the original position after a predetermined period of time has elapsed and/or all plenums 120 have been purged. The controller 334 sequences through each of the plenums 120, shutting the isolators 126 for all plenums other than that selected by the controller, thereby forcing the maximum amount of flow through the perforations 100 associated with the unisolated plenum.

Figure 10:
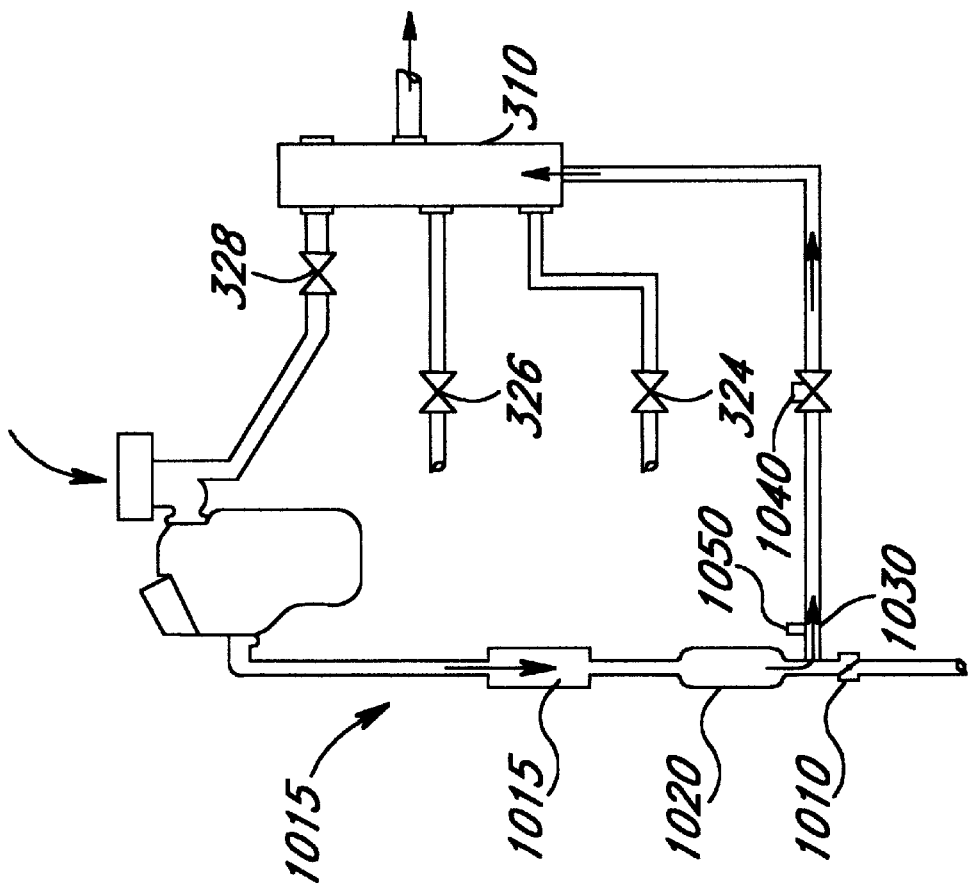
FIG. 10 is a schematic diagram of a second embodiment of the particulate backflush system of the present invention.

Alternatively, a second embodiment employs the vehicle engine exhaust system 1000 as a source of high pressure gas to flush particulates from the perforations 100, plenums 120, and manifold 310, as shown in FIG. 10. Specifically, a control damper 1010 located within the exhaust system 1000 downstream of the catalytic converter 1020 and other emission control systems 1015 is shut during the engine startup sequence to port engine exhaust through a high pressure line 1030 to the BLCS manifold 310. This downstream point of the exhaust system is chosen to provide the cleanest exhaust gas available. During this startup sequence, the controller logic sequentially opens the isolator 126 for each plenum (while shutting all others) in order to apply high pressure exhaust to the plenum and perforations. To preclude damage to any BLCS components due to high exhaust temperature, three distinct measures are utilized. First, a thermostatically controlled isolator valve 1040 is placed in the high pressure line 1030 leading from the exhaust system 1000 to the BLCS manifold 310. When a predetermined temperature is exceeded, the valve 1040 shuts to isolate the BLCS manifold 310 from the potentially damaging hot exhaust gas. In the present embodiment, the isolator valve is a solenoid valve which is further designed to shut upon electrical power failure (de-energization of the solenoid) under pressure of the exhaust gases. Second, a thermocouple 1050 or other temperature detecting device is placed on the exhaust system 1000 near the attachment point of the line; the output from this thermocouple is input to the controller 334 (via intermediate processing, such as an A/D converter) to evaluate the propriety of the startup sequence. Specifically, when the thermocouple output exceeds a predetermined potential difference, an appropriate logic signal is sent to the controller 334 to 1) prevent initiation of the startup sequence, or 2) terminate the sequence if already underway. Finally, the exhaust system damper 1010 is thermostatically controlled so as to open when a predetermined exhaust temperature is reached, thereby greatly reducing the exhaust backpressure within the high pressure line 1030. The head loss associated with the comparatively long length and narrow diameter of the line is high as compared to that of the downstream portion of the exhaust system; hence, no significant flow will occur through the high pressure line even if the thermostatic isolator valve 1040 fails. Note that for all types of vehicle propulsion systems, the startup sequence may be programmed for initiation at any interval such as on every vehicle startup, once per week, etc., or at operator discretion, as dictated by prevailing environmental conditions.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention.

What is claimed is:

1. A vehicle boundary layer control system, comprising:
   a plurality of perforations communicating with the surface of a vehicle, at least a portion of said surface being in communication with a boundary layer;
   a plurality of suction sources capable of providing a suction in at least one of said perforations;
   a suction isolator for selectively isolating said perforations from said suction sources;
   a plurality of detectors for detecting parametric information relating to said boundary layer; and
   a controller receiving input from one or more of said detectors, said controller being operatively connected to and dynamically controlling said suction isolator and said suction sources.

2. The vehicular boundary layer control system of claim 1, wherein said perforations are substantially circular in cross-section.

3. The vehicular boundary layer control system of claim 1, wherein said perforations vary in diameter as a function of location on said vehicle.

4. The vehicular boundary layer control system of claim 1, wherein said suction isolator is a solenoid valve.

5. The vehicular boundary layer control system of claim 1, wherein said controller is a digital signal processor (DSP).

6. A method of controlling the boundary layer of a terrestrial vehicle, said method comprising:
   providing a plurality of perforations in an outer surface of said vehicle, at least a portion of said outer surface being in contact with said boundary layer;
   connecting a plurality of suction sources to at least one of said perforations through a suction isolator;
   detecting parametric information relating to said boundary layer; and said parametric information in order to induce changes in said boundary layer.

7. A boundary layer control system for a terrestrial vehicle, comprising:
   a plurality of perforations formed in an outer surface of said vehicle;
   a plurality of suction sources;
   a manifold for selectively connecting two or more of said plurality of suction sources together;
   a conduit for connecting at least one of said perforations to said manifold;
   an isolator for isolating at least one of said perforations from said manifold;
   a sensor for detecting ambient parameters affecting said boundary layer;
   a detector for detecting aerodynamic turbulence in proximity to said outer surface; and
   a controller operatively connected to said isolator, manifold, and said suction detector and said sensor.

8. The vehicle boundary layer control system of claim 1, further comprising a plurality of suction sensors each having an output signal and sensing the suction associated with at least one of said suction sources, said controller performing dynamic arbitration between at least two of said plurality of suction sources based at least in part on said suction sensor output signals.

9. The vehicle boundary layer control system of claim 8, wherein said controller further comprises an algorithm which generates a desired suction value, and said dynamic arbitration between said plurality of suction sources is based at least in part on said desired suction value.

10. The vehicle boundary layer control system of claim 9, wherein algorithm generates said desired suction value based at least in part on periodic sampling of said input from said detectors.

11. The vehicle boundary layer control system of claim 10, wherein said detectors comprise at least one turbulence detector and a velocity sensor, and said algorithm generates said desired suction value based at least in part on the level of turbulence detected by said at least one turbulence detector for a given velocity.

12. The method of claim 6, wherein the act of selectively and dynamically controlling comprises:
    calculating at least one desired suction value based at least in part on said parametric information; and
    controlling the operation of said suction sources and said suction isolator to produce the desired suction value.

13. The method of claim 12, wherein the act of controlling the operation of said suction sources comprises:
    periodically sensing the magnitude of suction generated by each of said suction sources; and
    selectively connecting at least one of said suction sources to said at least one perforation based on the relationship between said sensed magnitude and said desired suction value.

* * * * *

UNITED STATES PATENT AND TRADEMARK OFFICE
CERTIFICATE OF CORRECTION

PATENT NO. : 6,068,328
DATED : May 30, 2000
INVENTOR(S) : Robert F. Gazdzinski

It is certified that error appears in the above-identified patent and that said Letters Patent is hereby corrected as shown below:

Column 6,
Line 47, "ondary high volume air pump 308. This pump The Existing" should read
-- ondary high volume air pump 308. The Existing --

Column 12, claim 1,
Line 14, "said suction sources." should read
-- said suction sources in order to selectively connect one or more of said sources to said perforations, thereby affecting said boundary layer. --

Column 12, claim 6,
Lines 9-10, "ary layer; and said parametric information in order to induce changes in said boundary layer." should read
-- ary layer; and selectively and dynamically controlling said suction isolator and selectively connecting one or more of said suction sources to the perforations based on said parametric information in order to induce changes in said boundary layer. --

Column 12, claim 7,
Line 17, ""manifold, and said suction detector and said sensor." should read
-- manifold, and said suction sources for selectively connecting one or more of said sources to said perforations based on input from said detector and said sensor. --

Signed and Sealed this

Twenty-fifth Day of December, 2001

*Attest:*

*Attesting Officer*

JAMES E. ROGAN
*Director of the United States Patent and Trademark Office*